(12) United States Patent
Ohtsuka

(10) Patent No.: US 6,351,972 B1
(45) Date of Patent: Mar. 5, 2002

(54) SYNTHETIC FUSED SILICA MEMBER, METHOD FOR PRODUCING THE SAME AND OPTICAL MEMBER FOR EXCIMER LASER

(75) Inventor: Hisatoshi Ohtsuka, Niigata-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/349,547

(22) Filed: Jul. 8, 1999

(30) Foreign Application Priority Data

Jul. 29, 1998 (JP) .......................... 10-228677

(51) Int. Cl.$^7$ .............................. C03B 20/00
(52) U.S. Cl. ...................... 65/17.4; 65/414; 65/421
(58) Field of Search .................. 65/17.4, 414, 413, 65/415, 416, 417, 418, 419, 420, 421, 422, 423

(56) References Cited

U.S. PATENT DOCUMENTS

| 5,028,407 A | * | 7/1991 | Chieng et al. ............... 423/338 |
| 5,158,587 A | * | 10/1992 | Kyoto et al. ................... 65/398 |
| 5,310,683 A | * | 5/1994 | Godec et al. ................. 436/123 |
| 5,364,428 A | * | 11/1994 | Kyoto et al. ................... 65/397 |
| 6,048,451 A | * | 4/2000 | Huff, Jr. et al. ............. 208/237 |

FOREIGN PATENT DOCUMENTS

| EP | 0719575 | 7/1996 |
| EP | 0760373 | 3/1997 |
| EP | 0870737 | 10/1998 |
| JP | 02-080343 | 3/1990 |
| JP | 03-279231 | 12/1991 |
| JP | 04-154629 | 5/1992 |
| WO | WO 98/47946 | 10/1998 |

OTHER PUBLICATIONS

Derwent No. 1990–129755, week 199017, JP 02080343 A, abstract.*

* cited by examiner

Primary Examiner—Sean Vincent
(74) Attorney, Agent, or Firm—Hogan & Hartson, L.L.P.

(57) ABSTRACT

There is disclosed a method for producing a synthetic fused silica member comprising vaporizing a raw material silane compound, hydrolyzing or oxidizing by combustion the vaporized silane compound in oxyhydrogen flame to form silica microparticles so that the silica microparticles should deposit on a rotating refractory carrier, and melting the silica microparticles during the deposition to form the synthetic fused silica member, wherein sulfur impurities are preliminarily removed from the raw material. According to the present invention, there are provided a synthetic fused silica member that does not emit yellow fluorescence at a wavelength of 560–580 nm even when it is irradiated with an ultraviolet ray by an excimer laser or the like, and hence can suitably be used for optical applications utilizing as a light source high energy ultraviolet rays such as those from excimer lasers, typically KrF and ArF excimer lasers, for example, use as a lens material for steppers and the like, and a method for producing the same, as well as an optical member such as lenses and photomasks produced from the synthetic fused silica material.

9 Claims, 1 Drawing Sheet

SYNTHETIC FUSED SILICA MEMBER, METHOD FOR PRODUCING THE SAME AND OPTICAL MEMBER FOR EXCIMER LASER

BACKGROUND OF THE INVENTION

1. Field of the Invention

The present invention relates to a synthetic fused silica member and a method for producing the same, as well as an optical member for excimer laser. In particular, the present invention relates to a synthetic fused silica member that can suitably be used for optical applications utilizing as a light source high energy ultraviolet rays such as those from excimer lasers, typically KrF and ArF excimer lasers, for example, use as a lens material for steppers and a synthetic fused silica material for photomasks, and a method for producing such a synthetic fused silica member, as well as an optical member for excimer laser produced from the synthetic fused silica material such as lenses, mirrors and photomasks.

2. Description of Related Art

With recent use of higher integration degree of semiconductor devices, in particular, VLSIs, the circuit pattern has rapidly become finer. Therefore, the wavelength and illuminance of light sources for the VLSI production are becoming shorter and stronger, respectively.

On the other hand, synthetic fused silica, which shows good performance in the ultraviolet range, has been getting importance as not only a material for photomasks but also a material for optical members such as lenses and mirrors in optical systems of light exposure apparatuses.

Such synthetic fused silica members are produced by, for example, vaporizing a raw material silane compound, hydrolyzing or oxidizing by combustion the vaporized silane compound in oxyhydrogen flame to form silica microparticles so that the silica microparticles should deposit on a rotating refractory carrier, and melting the silica microparticles during the deposition.

However, when a synthetic fused silica member produced from such a material is irradiated by a high energy ultraviolet light such as those from excimer lasers, it may emit yellow fluorescence at a wavelength of 560–580 nm. Therefore, when such a member is used for optical applications utilizing ultraviolet lights such as those from excimer lasers as a light source, for example, used as a lens for stepper, a material of photomask substrate or the like, it may cause a problem of light exposure of resists and the like. Accordingly, it may be unsuitable for use as a lens of stepper or the material of photomask substrate.

SUMMARY OF THE INVENTION

The present invention has been accomplished from the viewpoint of the above technical circumstance, and its object is to provide a synthetic fused silica member that does not emit yellow fluorescence at a wavelength of 560–580 nm even when irradiated with an ultraviolet light by an excimer laser or the like, and therefore can be suitably used for optical applications utilizing ultraviolet lights such as those from excimer lasers as a light source, for example, use as a lens material for stepper or the like. It is also an object of the present invention to provide a method for producing the aforementioned synthetic fused silica member, and an optical member for excimer laser produced from the aforementioned synthetic fused silica member, for example, a lens, photomask and the like.

The inventors of the present invention earnestly conducted studies in order to achieve the aforementioned object. As a result, it was found that sulfur impurities such as $SCl_2$ and $S_2Cl_2$ contained in the raw material silane compound caused the yellow fluorescence emission at a wavelength 560–580 nm of the synthetic fused silica member upon ultraviolet irradiation. That is, such sulfur impurities contained in the raw material silane compound are simultaneously vaporized when the silane compound is vaporized, and introduced into the oxyhydrogen flame together with the silane compound gas. In this case, the sulfur impurities are taken into the synthetic fused silica, which is considered to be inherently likely to incorporate sulfur compounds due to its structural characteristics. As a result, the synthetic fused silica member emits yellow fluorescence at a wavelength of 560–580 nm upon ultraviolet irradiation. The inventors of the present invention accomplished the present invention based on this finding.

That is, the present invention provides a method for producing a synthetic fused silica member comprising vaporizing a raw material silane compound, hydrolyzing or oxidizing by combustion the vaporized silane compound in oxyhydrogen flame to form silica microparticles so that the silica microparticles should deposit on a rotating refractory carrier, and melting the silica microparticles during the deposition to form the synthetic fused silica member, characterized in that sulfur impurities are preliminarily removed from the raw material.

If the causative substances of the aforementioned yellow fluorescence, i.e., the sulfur impurities, have been preliminarily removed from the raw material as in the aforementioned method of the present invention, the sulfur impurities are not introduced into the oxyhydrogen flame together with the silane compound when the silane compound is vaporized. Therefore, the sulfur impurities are not introduced into the produced synthetic fused silica member. As a result, the obtained synthetic fused silica member does not emit yellow fluorescence at a wavelength 560–580 nm even when irradiated with an ultraviolet light by an excimer laser or the like.

The influence of sulfur impurities contained in the raw material silane compound on the synthetic fused silica member has not been considered at all so far. Therefore, the sulfur impurities have not been preliminarily removed from the material in any conventional methods.

In the aforementioned method for producing a synthetic fused silica member according to the present invention, the sulfur impurities are preliminarily removed from the raw material preferably to a level of 10 ppm or less.

If the sulfur impurities are preliminarily removed from the material to a level of 10 ppm or less, a significant amount of sulfur impurities that may cause the problem are not introduced into the synthetic fused silica member, and therefore the synthetic fused silica member does not emit yellow fluorescence at a wavelength 560–580 nm even when irradiated with an ultraviolet light by an excimer laser or the like.

In the method for producing a synthetic fused silica member according to the present invention, the sulfur impurities are preferably sulfur chlorides.

Among the sulfur impurities, sulfur chlorides (e.g., $SCl_2$, $S_2Cl_2$), in particular, have a boiling point substantially the same as that of the raw material silane compound. Therefore, among the sulfur impurities, sulfur chlorides are particularly likely to be simultaneously vaporized when the silane compound is vaporized, and introduced into oxyhydrogen flame together with the silane compound. That is, sulfur chlorides are more likely to be incorporated into the synthetic fused silica members compared with other sulfur impurities. Therefore, since sulfur chlorides among the sulfur impurities are particularly likely to cause the yellow fluorescence, it is particularly necessary to preliminarily remove sulfur chlorides.

In the aforementioned method according to the present invention, the silane compound is preferably a compound represented by the formula (1):

$$R_nSiX_{4-n} \tag{1}$$

wherein R each represents hydrogen atom or a monovalent aliphatic hydrocarbon group, which may be identical or different, x represents a halogen atom or a group —OR, and n represents an integer of 0–3, or the formula (2):

$$SixRyOz \tag{2}$$

wherein R has the same meaning as defined above, x represents an integer not less than 2, y represents a positive integer not more than 2x+2, and z represents a positive integer not more than 2x.

Those silane compounds represented by the aforementioned formulae can easily be obtained as a usual material of synthetic fused silica members, and have widely been used. Therefore, they are preferably used also in the present invention.

The present invention also provides a synthetic fused silica member produced by the aforementioned method for producing a synthetic fused silica member of the present invention.

Because the synthetic fused silica member produced by the method for producing a synthetic fused silica member of the present invention contains few or substantially no sulfur impurities, it does not emit yellow fluorescence at a wavelength 560–580 nm even when irradiated with an ultraviolet light by an excimer laser or the like.

The present invention further provides an optical member for excimer laser characterized in that it is produced from the aforementioned synthetic fused silica member of the present invention.

As described above, if the synthetic fused silica member of the present invention, which contains substantially no sulfur impurities, is used for the production of an optical member for excimer laser such as a lens and photomask, the optical member does not emit yellow fluorescence at a wavelength 560–580 nm even when irradiated with an ultraviolet light. Therefore, the optical member for excimer laser of the present invention is an extremely excellent optical member that does not cause light exposure of resists and the like due to the yellow fluorescence.

According to the production method of the present invention, a synthetic fused silica member containing few or substantially no sulfur impurities can be produced. As a result, this synthetic fused silica member does not emit yellow fluorescence at a wavelength of 560–580 nm even when it is irradiated with an ultraviolet ray of high energy by an excimer laser or the like. Therefore, it does not cause light exposure of resists or the like due to such yellow fluorescence. Accordingly, the synthetic fused silica member of the present invention is suitably used as a material for optical applications utilizing ultraviolet rays such as those from excimer lasers as a light source, for example, use as a lens for stepper, photomask and the like.

DESCRIPTION OF THE INVENTION AND EMBODIMENTS

Figure 1:
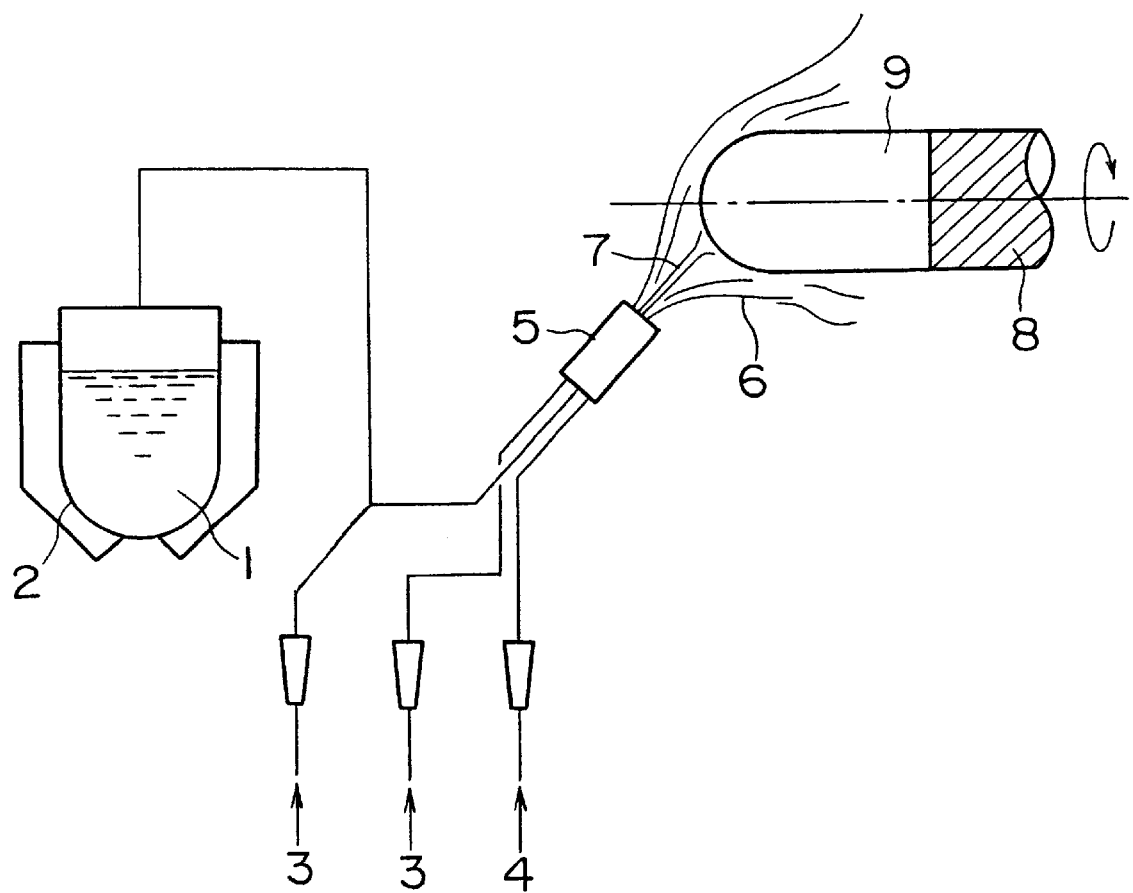
FIG. 1 represents a schematic structural view of an apparatus for producing a synthetic fused silica member used in the examples.

Embodiments of the present invention will be explained hereinafter, but the present invention is not limited to these.

The method for producing a synthetic fused silica member of the present invention is characterized in that the sulfur impurities are preliminarily removed from the raw material. The raw material may be any one of vaporizable silane compounds used for the production of synthetic fused silica members. Examples of such silane compounds include, for example, those represented by the formula (1):

$$R_nSiX_{4-n} \tag{1}$$

wherein R represents hydrogen atom or a monovalent aliphatic hydrocarbon group, which may be identical or different, X represents a halogen atom or a group —OR, and n represents an integer of 0–3.

Each group R represents E or a monovalent aliphatic hydrocarbon group, and all of the groups R may not necessarily be identical, and may be different from one another. Examples of the monovalent aliphatic hydrocarbon group include, for example, methyl, ethyl and the like. X is a halogen atom or a group —OR. Examples of the halogen atom include, for example, Cl, F and the like.

Specific examples of the compounds represented by the formula (1) include, for example, $SiCl_4$, $SiF_4$, $HSiCl_3$, $SiH_4$, $CH_3SiCl_3$, $CH_3Si(OCH_3)_3$, $Si(OCH_3)_4$, $Si(OC_2H_5)_4$ and the like.

Examples of the silane compounds further include, for example, those represented by the formula (2):

$$SixRyOz \tag{2}$$

wherein R has the same meaning as defined above, x represents an integer not less than 2, y represents a positive integer not more than 2x+2, and z represents a positive integer not more than 2x.

Specific examples of the compounds represented by the formula (2) include, for example, siloxanes such as hexamethyldisiloxane, hexamethylcyclotrisiloxane, octamethylcyclotetrasiloxane, decamethylcyclopentasiloxane and the like.

The aforementioned silane compounds can be used individually or as a combination of two or more kinds of those compounds.

In the production method of the present invention, sulfur impurities are preliminarily removed from the aforementioned raw material. Among the sulfur impurities, in particular, those sulfur impurities likely to be simultaneously vaporized in the vaporization step of the raw material silane compound and entrained by it must be removed. This is because those sulfur impurities not entrained by the silane compound are not introduced into the synthetic fused silica member. Those sulfur impurities likely to be entrained include, for example, those having a boiling point close to that of the silane compound, for example, sulfur chlorides, more specifically, $SCl_2$, $S_2Cl_2$ and the like. In particular, $SCl_2$ has a boiling point of 59° C., which is different by only 2° C. from the boiling point of the typical raw material $SiCl_4$, 57° C. Therefore, when $SiCl_4$ is used as the raw material, it is necessary to preliminarily remove, in particular, $SCl_2$.

The removal of the sulfur impurities can be accomplished by, for example, utilizing difference of physicochemical properties (boiling point etc.) between the raw material and the sulfur impurities, for example, by distillation or the like.

However, it is difficult to remove sulfur impurities having a boiling point similar to that of the raw material to a level of 1 ppm or less only through purification by distillation. Therefore, when the sulfur impurities are desired to be removed to a level of 1 ppm or less, for example, absorption with activated carbon can preferably be used.

The removal of the sulfur impurities must at least be performed to a level of 1000 ppm or less of the sulfur impurities. In particular, those sulfur impurities having a boiling point close to that of the raw material, for example, sulfur chlorides, are preferably removed to a level of 20 ppm or less, more preferably 10 ppm or less, because they are likely to be entrained by the raw material gas as described above.

In the production method of the present invention, the raw material silane compound from which the sulfur impurities has been preliminarily removed is then vaporized. By the vaporization, silica microparticles can be formed in oxyhydrogen flame. The vaporization can be preferably performed by, for example, filling a stainless steel tank with the raw material silane compound, adjusting the temperature in the tank to a level around the boiling point of the raw material silane compound or less, and passing a carrier gas through the tank to vaporize the silane compound. By such an operation, components having a high boiling point among the sulfur impurities are prevented from being entrained. The carrier gas may be, for example, $O_2$, Ar, $N_2$ or the like.

As another way of the vaporization, the tank can be heated by steam heating or the like without using the carrier gas. In this case, the vaporization can be performed at a heating temperature higher than the boiling point of the silane compound, e.g., 80 to 100° C.

Then, the vaporized silane compound is hydrolyzed or oxidized by combustion in oxyhydrogen flame. Specifically, the aforementioned silane compound gas and combustion gas can be introduced into the same burner with the aforementioned carrier gas as required. The burner may be, for example, a burner made of quartz glass. While the gas flow rate is not particularly limited, for example, a mixed gas of the raw material silane compound and oxygen gas, which are maintained at a predetermined temperature, can be introduced at a flow rate of 0.5 to 1.5 $Nm^3$/hour together with oxygen gas at a flow rate of 3 to 5 $Nm^3$/hour and hydrogen gas at a flow rate of 8 to 12 $Nm^3$/hour each from separate nozzles of the burner. Thus, the raw material silane compound is hydrolyzed or oxidized by combustion in the oxyhydrogen flame to form silica microparticles.

The silica microparticles formed above are allowed to deposit on a rotating carrier and simultaneously melted. The carrier must be refractory one, since the silica microparticles are melted on it by heating. As this carrier, a natural quartz bar is usually used. The rotation speed of the refractory carrier can suitably be selected depending on the gas flow rates in the burner and the like, and it may be, for example, 1 to 100 rpm.

The silica microparticles deposited on the refractory carrier as described above are melted during the deposition. Specifically, they can be melted by sensible heat of the oxyhydrogen flame for the silica microparticle formation.

The synthetic fused silica member of the present invention produced as described above contains extremely few or substantially no sulfur impurities, and therefore this synthetic fused silica member does not emit yellow fluorescence at a wavelength of 560–580 nm even when irradiated with an ultraviolet ray by an excimer laser or the like.

Specifically, when the obtained synthetic fused silica member is sliced into plates in a suitable size, and the plates are mirror polished and irradiated by a KrF excimer laser, they emit only light red fluorescence. This red fluorescence is not in a wavelength region causing light exposure of resists and the like. Therefore, the synthetic fused silica member of the present invention can suitably be used as a material for optical members for excimer laser such as lenses and photomasks.

On the other hand, as for conventional synthetic fused silica members produced from a silane compound raw material from which sulfur compounds are not removed, mirror polished plates produced from such members in such a manner as described above may emit yellow fluorescence at a wavelength of 560–580 nm when irradiated by a KrF excimer laser. This wavelength region overlaps the wavelength region causing light exposure of resists and the like. Therefore, if such conventional synthetic fused silica members are used as a material for optical members for excimer laser such as optical lenses and photomasks, they may adversely affect patterning utilizing resists and the like.

As explained above, the synthetic fused silica member of the present invention can be suitably used for optical members for excimer laser such as optical lenses and photomasks, in particular, as a material for optical members for steppers. These members can be obtained by cutting a piece from the material and processed the piece into a desired shape in a conventional manner. The optical members for excimer laser produced from the synthetic fused silica member of the present invention do not emit yellow fluorescence at a wavelength of 560–580 nm even when irradiated with an ultraviolet light by an excimer laser or the like. Therefore, extremely precise patterning can be performed.

EXAMPLES

The present invention will be specifically explained hereinafter with reference to the following examples and FIG. 1.

(Examples 1 and 2, and Comparative Examples 1 and 2)

Silicon tetrachloride was used as a raw material. This raw material was distilled, and further subjected to adsorption treatment utilizing activated carbon to reduce its sulfur impurities to a level below the detection limit. Then, this silicon tetrachloride was added with sulfur chloride ($SCl_2$) at each concentration shown in Table 1, and used as a raw material silane compound 1.

This raw material 1 was charged in a 20 L stainless steel evaporator 2. Then, the silicon tetrachloride was vaporized by steam heating where the temperature in the evaporator 2 was set at 90° C. The vaporized silicon tetrachloride gas at a flow rate of 0.3 $Nm^3$/hour was mixed with oxygen gas at a flow rate of 0.8 $Nm^3$/hour, and introduced into oxyhydrogen flame 6 thrown from a quartz burner 5 to form silica microparticles 7. To the burner 5, oxygen gas 3 at a flow rate of 4 $Nm^3$/hour and hydrogen gas 4 at a flow rate of 10 $Nm^3$/hour were supplied from respective nozzles. The silica microparticles 7 formed above were allowed to deposit on a synthetic fused silica carrier 8 rotating at 10 rpm, and melted simultaneously for vitrification to produce a transparent synthetic fused silica member 9 (100φ×500 mm).

Plates of 80 mm square×10 mm were sliced from the above synthetic fused silica member 9, and their entire surfaces were mirror polished to obtain samples for laser irradiation.

Then, each of the above samples was irradiated by a KrF excimer laser at an energy density of 100 mj/cm² p and a frequency of 100 Hz for 5 minutes. The samples were visually inspected for fluorescence color upon irradiation. The results are shown in Table 1.

TABLE 1

|  | $SCl_2$ concentration (ppm) | Fluorescence color |
|---|---|---|
| Example 1 | 0.2 | Light red |
| Example 2 | 10.0 | Light red |
| Comparative Example 1 | 100 | Yellow |
| Comparative Example 2 | 1000 | Orange |

As clearly seen from the results shown in Table 1, when a silane compound raw material having a sulfur chloride concentration of 10 ppm or less was used, the produced synthetic fused silica members did not emit yellow fluorescence harmful to resists and the like. In contrast, when a raw material having a high sulfur chloride concentration, in particular 100 ppm or more, was used, the produced synthetic fused silica members began to emit yellow fluorescence.

The present invention explained hereinabove is not limited to the embodiments mentioned above. The above-described embodiments are mere examples, and those having the substantially same structure as that described in the appended claims and providing the similar functions and advantages are included in the scope of the present invention.

What is claimed is:

1. A method for producing a synthetic fused silica member comprising vaporizing a raw material silane compound, hydrolyzing or oxidizing by combustion the vaporized silane compound in oxyhydrogen flame to form silica microparticles so that the silica microparticles deposit on a rotating refractory carrier, and melting the silica microparticles during the deposition to form the synthetic fused silica member, wherein the raw material silane compound is represented by the formula (1):

$$R_nSiX_{4-n} \quad (1)$$

wherein R each represents hydrogen atom or a monovalent aliphatic hydrocarbon group, which may be identical or different, X represents a halogen atom, and n represents an integer of 0–3, or the formula (2):

$$Si_xR_yO_z \quad (2)$$

wherein R has the same meaning as defined above, x represents an integer not less than 2, y represents a positive integer not more than 2x+2, and z represents a positive integer not more than 2x, is prepared and the sulfur impurities are preliminarily removed from the raw material by absorption with activated carbon after distillation.

2. The method for producing a synthetic fused silica member according to claim 1, wherein the sulfur impurities are preliminarily removed from the raw material to a level of 10 ppm or less.

3. The method for producing a synthetic fused silica member according to claim 1, wherein the sulfur impurities are composed of sulfur chloride.

4. The method for producing a synthetic fused silica member according to claim 2, wherein the sulfur impurities are composed of sulfur chloride.

5. A synthetic fused silica member which is produced by the method for producing a synthetic fused silica member according to claim 1.

6. A synthetic fused silica member which is produced by the method for producing a synthetic fused silica member according to claim 2.

7. A synthetic fused silica member which is produced by the method for producing a synthetic fused silica member according to claim 3.

8. A synthetic fused silica member which is produced by the method for producing a synthetic fused silica member according to claim 4.

9. An optical member for excimer laser which is produced from the synthetic fused silica member according to claim 5.

* * * * *